United States Patent
Kishikawa et al.

(10) Patent No.: US 6,342,554 B1
(45) Date of Patent: Jan. 29, 2002

(54) SURFACE TREATMENT AGENT FOR STEEL MATERIAL

(75) Inventors: Hirofumi Kishikawa; Masato Yamashita, both of Osaka; Atsumu Kanda; Hiroshi Ono, both of Amagasaki, all of (JP)

(73) Assignees: Sumitomo Metal Industries, Ltd., Osaka; Shinto Paint Co., Amagasaki, both of (JP)

( * ) Notice: Subject to any disclaimer, the term of this patent is extended or adjusted under 35 U.S.C. 154(b) by 0 days.

(21) Appl. No.: 09/309,482

(22) Filed: May 10, 1999

Related U.S. Application Data

(63) Continuation of application No. PCT/JP98/00228, filed on Jan. 22, 1998.

(51) Int. Cl.$^7$ .............................................. C23C 22/50
(52) U.S. Cl. ..................... 524/407; 148/267; 148/274; 148/251; 148/266; 106/14.45
(58) Field of Search ................................ 148/266, 267, 148/274, 251; 106/14.45; 524/407

(56) References Cited

U.S. PATENT DOCUMENTS

| | | | |
|---|---|---|---|
| 3,873,486 A | 3/1975 | Drelich | 524/407 |
| 3,954,511 A | * 5/1976 | Kado et al. | |

FOREIGN PATENT DOCUMENTS

| | | |
|---|---|---|
| JP | Hei-01/142088 | 6/1989 |
| JP | 03320646 | 4/1991 |
| JP | 05105269 | 5/1993 |
| JP | 05-156466 A | * 6/1993 |
| JP | 06-136557 A | * 5/1994 |

OTHER PUBLICATIONS

"industrial polymers, major" Encyclopædia Britannica Online. <http://www.search.eb.com/bol/topic?eu=129052&sctn=7&pm=1>[Accessed Dec. 14, 2000].

* cited by examiner

*Primary Examiner*—Roy King
*Assistant Examiner*—Harry D. Wilkins, III
(74) *Attorney, Agent, or Firm*—Kolisch Hartwell Dickinson McCormack & Heuser

(57) ABSTRACT

Disclosed herein is a surface treatment agent for steel, characterized in that, said agent contains 0.1–15% by mass of chromium sulfate and 10–40% by mass of a binder resin containing butyral resin or a mixture of butyral resin with another resin which is compatible with butyral resin.

15 Claims, No Drawings

SURFACE TREATMENT AGENT FOR STEEL MATERIAL

This application is a continuation of PCT/JP98/00228, filed on Jan. 22, 1998.

TECHNICAL FIELD OF THE INVENTION

The present invention relates to a novel surface treatment agent for steel material and, more particularly, it relates to a surface treatment agent which is capable of forming a rust layer (hereinafter, referred to as weather resistant stable rust) in an early stage which has a protective action even to a severe atmospheric corrosion environment being affected by salt such as in coastal districts and also relates to steel material coated with said surface treatment agent.

PRIOR ART

It is generally possible to improve corrosion resistance of steel in air by adding elements such as phosphorus, copper, chromium and nickel thereto.

Such a low-alloy steel is called weather resistant steel and is the so-called maintenance-free steel where anticorrosive operation such as painting is not necessary since it forms a rust having a protective action to corrosion (hereinafter, referred to as weather resistant rust) within several years in outside.

However, over ten years are necessary for the formation of the weather resistant rust and, therefore, uncoherent rust or rust-laden water such as red rust or yellow rust is resulted during that period and there are disadvantages not only that it is an undesirable appearance but also it causes pollution of the surrounding environment. Especially in the environment where sea salt particles fly through the air, such a tendency is significant and, moreover, it is a problem that no weather resistant rust is formed.

With regard to said problem, there has been a proposal for a method of surface treatment for formation of phosphate coat as mentioned in the Japanese Laid-Open Patent Publication Hei-01/142,088.

In the proposal however, the treatment is complicated because of necessity of an appropriate pretreatment before formation of the phosphate coat and, in addition, it is not easy to conduct the treatment on a welded part when welding of steel material is necessary whereby there is another problem that said treatment is difficult to apply to building structures.

Further, it is still questionable whether the weather resistant rust is formed by this method under the severe atmospheric corrosive environment where salt flies through the air.

PROBLEMS TO BE SOLVED BY THE INVENTION

The present invention has been achieved under such a current status of art and an object of the present invention is to develop a surface treatment agent which is able to form a weather resistant stable rust on a steel material in early stage by applying to the surface or rust layer of the so-called rust-forming steel material such as normal steel or low alloy steel such as weather resistant steel and also to develop a steel material to which said surface treatment agent is applied.

MEANS TO SOLVE THE PROBLEMS

In order to achieve the above object, the present inventors analyzed the stable rust which was produced by exposure for 20 years or more and have found that the resulting weather resistant stable rust comprises very tight aggregates of fine crystals consisting of $\alpha\text{-(Fe,Cr)OOH}$ (hereinafter, referred to as chromium substituted goethite).

Therefore, for forming the weather resistant rust in an early stage and for suppressing the formation of uncoherent rust and rust-laden water, it is important to know how to promote the formation of the very tight chromium substituted goethite.

The present inventors have further found a specific means for solving the above-mentioned problems in which a treatment agent consisting of chromium sulfate and butyral resin is applied to the surface or the rust layer of steal material whereby the weather resistant stable rust can be formed in an early stage without generation of rust-laden water and the like.

The present invention has been accomplished based upon the above findings and its essential feature is as follows.

Thus, the present invention is a surface treatment agent for steel, characterized in that, said agent contains 0.1–15% by mass of chromium sulfate and 10–40% by mass of a binder resin containing butyral resin or a mixture of butyral resin with another resin which is compatible with butyral resin.

EMBODIMENTS OF THE INVENTION

The present invention will be illustrated in detail as hereunder.

(1) Effect of chromium sulfate

When the structure of rust is tight, it is apt to physically shield the atmospheric corrosive environment and also reduces the dissolution of iron ion which is a fundamental cause of uncoherent rust and rust-laden water.

However, if there are cracks or pores in the rust, they act as a route for supplying water and oxygen and anticorrosive property of the rust is reduced. Therefore, it is necessary to form a very tight and continuous rust layer.

Chromium sulfate becomes chromium ion and sulfate ion arriving to the interface of coat and steel when water is permeated through the coat. Sulfate ion and water corrode steel and then produce iron ion. Chromium ion has an effect of converting the iron ion to chromium substituted goethite which is a main component of weather resistant stable rust.

In addition, it is believed that sulfate ion not only promotes the initial iron ion formation but also participates in making the stable rust layer fine and very tight.

In order to achieve such an effect even in a severe atmospheric corrosive environment such as where salt flies through the air, it is necessary to add 0.1–15% by mass of chromium sulfate to the treatment agent.

When the steel which is coated with the treatment agent being added with 0.1% by mass or more of it and has a dried coat on the surface is allowed to stand in an atmospheric corrosive environment, the weather resistant rust which is formed in early stage shows an effect of suppressing the permeation of corrosive anion.

The reason why the upper limit is set at 15% by mass is that, if it is not, the suppressing effect of the formed weather resistant stable rust to corrosive anion is reduced whereby the anticorrosive action under a severe corrosive environment cannot be guaranteed. The amount of chromium sulfate mentioned here is that to the solid part of the treatment agent excluding volatile matters such as solvents.

(2) Effect of binder resin

Examples of the binder resin used in the present invention are butyral resin and a mixture of butyral resin with another resin which is compatible with butyral resin (such as melamine resin and phenol resin).

When the amount of the binder resin in the treatment agent is less than 10% by mass, uniform coat is not obtained and, in addition, the resulting coat has no adhesive force and strength durable to furnishing.

On the other hand, when the amount of the binder resin is more than 40% by mass, amount of the water permeating into the coat becomes small and formation of weather resistant stable rust is markedly retarded.

Since butyral resin is very soft and flexible and adapts without difficulty to the changes in the shape of steel surface as a result of formation of rust, it is an essential component in the treatment agent of the present invention.

Incidentally, the treating agent is applied after making into liquid and it goes without saying that the agent may contain organic solvent necessary therefor.

In addition to chromium sulfate, the treatment agent of the present invention may contain other additives including coloring pigments such as iron oxide, titanium dioxide, carbon black and phthalocyanine blue; extenders such as talc, silica, mica, barium sulfate and calcium carbonate; anticorrosive pigments such as chromium oxide, zinc chromate, lead chromate and basic sulfate; thickeners; dispersing agents; and reaction promoters.

It goes without saying that viscosity of the treatment agent of the present invention upon use is adjusted to such an extent that it is suitable for the applying operation with organic solvent and said solvent evaporates by natural drying after being applied.

Moreover, phosphate or its aqueous solution may be added thereto and, in fact, that is rather convenient because the coexistence of phosphate and chromium ion has an effect of promoting the formation of chromium substituted goethite.

When the coat thickness after drying and solidification of the treatment agent mentioned hereinabove becomes 5–50 $\mu$m, feeding of chromium ion and iron ion during the formation of weather resistant stable rust is well balanced and, therefore, that is a preferred thickness of the coat.

The treatment agent mentioned hereinabove can be applied by common methods like in the case of conventional application such as air spray, airless spray or application by brush and, therefore, the application is possible at any place.

In addition, the effect is achieved by mere one application and, therefore, this is economically satisfactory as well. Further, application at the site is possible and, therefore, the agent can be applied after the process of steel such as cutting and welding at the site or to the steel where the rust was already generated on the surface.

After the weather resistant stable rust is formed, the corrosion speed of the steel material becomes very low. Accordingly, it is also possible to further apply the colored coat on the upper layer and, as compared with the application of colored coat on unpainted steel having the surface such as blasting, it is also expected to extend the life of the colored coat.

With regard to the steel material to which the treatment agent of the present invention is applied, there is no particular limitation for the type of the steel but any of ordinary steel and low-alloy steel such as weather resistant steel may be used so far as it forms the so-called rust.

It goes without saying that, even if cracking or exfoliation is resulted due to the force from outside in the protective rust layer formed as such, chromium sulfate is supplied from the normal part to the damaged part provided that chromium sulfate remains in the coat of the normal part whereby the self-repairing property for re-forming the weather resistant stable rust can be expected.

EXAMPLES

Superiority of the treatment agent of the present invention will be illustrated by way of the following examples although the present invention is not limited thereto.

First, chemical composition of the test steel used in the examples of the present invention is shown in Table 1 and the pretreatment is shown in Table 2. Size of the test piece was made 150×70×3.2 mm.

TABLE 1

| | Chemical Composition of the Test Steel | | | | | | | | |
|---|---|---|---|---|---|---|---|---|---|
| C | Si | Mn | P | S | M | N | Cr | Ni | Cu |
| (1) 0.11 | 0.24 | 0.75 | 0.030 | 0.005 | 0.03 | 0.004 | 0.49 | 0.12 | 0.33 |
| (2) 0.12 | 0.01 | 0.30 | 0.008 | 0.005 | 0.03 | 0.01 | 0.01 | 0.01 | 0.01 |

TABLE 2

Method of Pretreatment of Steel Material

X: Rust was removed by means of a shot blasting
Y: Previously exposed for 30 days in the coastal district (in Naoetsu City, Niigata Prefecture; 100 m from coastline)

Formulations of the treatment agents used for the test, conditions for preparing the samples and result of the test are shown in Table 3.

TABLE 3

| | Examples | | | | | | Comparative Examples | | | | |
|---|---|---|---|---|---|---|---|---|---|---|---|
| | 1 | 2 | 3 | 4 | 5 | 6; | 7 | 8 | 9 | 10 | 11 |
| Test steel material | (1) | (1) | (1) | (1) | (2) | (1) | (1) | (1) | (1) | (1) | (1) |
| Pretreatment | X | X | X | Y | X | X | X | X | X | X | X |
| Formulation of the Treatment Agent* | | | | | | | | | | | |
| Resin added | A | A | A | B | A | A | A | A | C | A | A |
| (mass %) | 37 | 37 | 34 | 3 | 37 | 37 | 37 | 37 | 37 | 8 | 45 |
| Chromium sulfate | 5 | 10 | 15 | 15 | 15 | 0.5 | 0 | 25 | 15 | 15 | 15 |
| Barium sulfate | 38 | 33 | 28 | 28 | 28 | 28 | 43 | 18 | 28 | 57 | 20 |

TABLE 3-continued

|  | Examples | | | | | | Comparative Examples | | | | |
| --- | --- | --- | --- | --- | --- | --- | --- | --- | --- | --- | --- |
|  | 1 | 2 | 3 | 4 | 5 | 6; | 7 | 8 | 9 | 10 | 11 |
| Iron oxide | 15 | 15 | 15 | 15 | 15 | 14.5 | 15 | 15 | 15 | 15 | 15 |
| Other additives | 5 | 5 | 5 | 5 | 5 | 5 | 5 | 5 | 5 | 5 | 5 |
| Coat thickness ($\mu$m) | 20 | 20 | 20 | 20 | 20 | 20 | 20 | 20 | 20 | 20 | 20 |
| Cr substituted goethite | ○ | ○ | ○ | ○ | ○ | ○ | X | ○ | ○ | ○ | Δ |
| Corrosion loss per side ($\mu$m) | 5 | 5 | 5 | 15 | 23 | 11 | 326 | 5 | 215 | 180 | 5 |
| Checkers adhesion | 10 | 10 | 10 | 8 | 8 | 10 | 4 | 4 | 2 | 4 | 10 |
| Rust-laden water | no | no | no | no | no | no | yes | no | yes | yes | no |
| Appearance | vt | vt | vt | t | t | t | c | c-d | c-c | c | vt |

*amount (mass %) excluding the solvent resins: A - butyral resin; B - phenol resin; C - alkyd resin
vt: very tight
t: tight
c: coarse
c-d: coarse and discolored
c-c: coarse and cracked An appropriate amount of solvent was added to the formulation consisting of resins, pigments and additives as given in Table 3 to prepare a treatment agent where the viscosity (as measured by a viscometer of type B) was adjusted to 200~1,000 cP and the resulting agent was applied by means of an air spraying.

The resulting sample test pieces were exposed for one year in the coastal district in Naoetsu City, Niigata Prefecture (100 m from coastline) under the same condition that those test pieces were placed horizontally and their upper surface was sprinkled with 1 mg/dm$^2$ of a powder preparation for artificial sea water every day.

Then the remaining coat and rust were removed, weighed and the resulting weight was deducted from the weight of steel material before application to determine the corrosion loss. In Table 3, average corrosion loss of one side which is one half of the determined corrosion loss is shown.

In the case of the sample Y (Example 4), average corrosion loss of the unapplied sample was determined wherefrom the average of the rust formation by the initial exposure was calculated and this was deducted as a blank.

With regard to the samples after being exposed, cross section of the resulting rust was subjected to a structure analysis by means of Raman spectroscopy and also to elementary analysis of the rust whereby it was ascertained whether or not the chromium substituted goethite was formed. The state of formation of the chromium substituted goethite was expressed as follows. ○: formed; Δ: in trace; X: not formed.

With regard to the checkers adhesion, it was evaluated in accordance with the regulation of JIS K5400-8.5.1 (gap distance: 2 mm) and was expressed from "10" for good to "0" for bad.

As a result, in Examples 1–6, formation of rust-laden water was not noted but corrosion loss was small and formation of weather resistant stable rust (chromium substituted goethite layer) on the ground steel was noted.

Such an effect was achieved even for the steel material where rust was formed on the ground steel (Example 4) and also for the case where the application was conducted to ordinary steel (Example 5).

On the other hand, when the amount of chromium sulfate was not within an appropriate range as shown in Comparative Examples 7 and 8, formation of weather resistant stable rust was insufficient, corrosion loss was big, adhesion of the coat was low and appearance was not good lacking the aptitude for the coat.

When the binder resin was not butyral resin as shown in Comparative Example 9, the corrosion loss became high, the coat was coarse and gave fine cracks and the adhesion was low lacking the aptitude for the treatment agent.

When the amount of the binder resin was small as shown in Comparative Example 10, the coat was coarse and adhesion was low lacking the aptitude for the treatment agent.

When the amount of the binder resin was too much as shown in Comparative Example 11, formation of chromium substituted goethite was poor.

MERIT OF THE INVENTION

As fully illustrated hereinabove, the treatment agent of the present invention contains 0.1–15% by mass of chromium sulfate and 10–40% by mass of a binder resin containing butyral resin or a mixture of butyral resin and another resin which is compatible with butyral resin and, when said agent is applied to steel material followed by drying, uncoherent rust and rust-laden water such as red rust and yellow rust are not formed even under severe atmospheric corrosive environment and it is now possible to secure the anticorrosive property of steel material wherein weather resistant stable rust layer is formed on the steel material surface at an early stage. Even under the especially severe corrosive environment near sea coast where sea salt particles fly through the air, the above merit is still achieved and, therefore, the treatment agent can be said to be very useful.

When the treatment agent of the present invention is applied to steel materials for civil engineering and building constructions, it is now possible to form weather resistant stable rust in an early stage without formation of uncoherent rust and rust-laden water such as red rust and yellow rust. Accordingly, maintenance for preventing the corrosion of steel material is no longer necessary and it is expected to greatly contribute to the fulfillment of social capital.

What is claimed is:

1. A steel surface treatment agent, characterized in that, said agent contains 0.1–15% by total solids mass of chromium sulfate and 10–40% by total solids mass of a binder resin containing butyral resin or a mixture of butyral resin with another resin which is compatible with butyral resin.

2. The surface treatment agent of claim 1, wherein the resin that is compatible with butyral resin is melamine resin.

3. The surface treatment agent of claim 1, wherein the resin that is compatible with butyral resin is phenol resin.

4. The surface treatment agent of claim 1, further comprising an organic solvent.

5. The surface treatment agent of claim 1, further comprising a coloring agent.

6. The surface treatment agent of claim 5, wherein the coloring agent is selected from the group consisting of iron oxide, titanium dioxide, carbon black and phthalocyanine blue.

7. The surface treatment agent of claim 1, further comprising an extender.

8. The surface treatment agent of claim 7, wherein the extender is selected from the group consisting of talc, silica, mica, barium sulfate and calcium carbonate.

9. The surface treatment agent of claim 1, further comprising an anticorrosive pigment.

10. The surface treatment agent of claim 9, wherein the anticorrosive pigment is selected from the group consisting of chromium oxide, zinc chromate, lead chromate and basic sulfate.

11. The surface treatment agent of claim 1, further comprising a thickener.

12. The surface treatment agent of claim 1, further comprising a dispersing agent.

13. The surface treatment agent of claim 1, further comprising a reaction promoter.

14. The surface treatment agent of claim 1, further comprising a phosphate.

15. A steel surface treatment agent for causing the formation of a layer of protective rust on a steel substrate, the surface treatment agent comprising a mixture of solids including 0.1–15% chromium sulfate by mass of total solids and 10–40% a binder resin by mass of total solids, the binder resin containing butyral resin; and an organic solvent.

* * * * *